Sept. 30, 1924.

W. HOVEY

HUB CONSTRUCTION

Filed Dec. 26, 1923

1,510,278

William Hovey, INVENTOR.

BY

Geo. P. Kimmel
ATTORNEY.

Patented Sept. 30, 1924.

1,510,278

UNITED STATES PATENT OFFICE.

WILLIAM HOVEY, OF ROLLINGDAM STATION, NEW BRUNSWICK, CANADA.

HUB CONSTRUCTION.

Application filed December 26, 1923. Serial No. 682,750.

*To all whom it may concern:*

Be it known that I, WILLIAM HOVEY, a subject of the King of Great Britain, residing at Rollingdam Station, New Brunswick, Canada, have invented certain new and useful Improvements in Hub Constructions, of which the following is a specification.

This invention relates to wheel hub construction, and has for its primary object the provision, in a manner as hereinafter set forth, of a hub so constructed that all possibility of the spoke becoming loose and separating, or in any manner shifting their position at the hub of the wheel, will be eliminated.

Another object of the invention is the provision, in a manner as hereinafter set forth, of a wheel hub having means whereby the inner portion which contacts with the spindle of the axle may be removed and replaced in event that this part becomes worn and out of alinement.

Another object of the this invention is the provision, in a manner as hereinafter set forth, of a wheel hub having the butted ends of the spokes of a novel design whereby, they may be held securely in position against the wheel box without the necessity of gluing or otherwise securing them together.

A still further object of this invention is the provision in a manner as hereinafter set forth, of a wheel hub formed in two sections in screw threaded engagement with the wheel box, and each section adapted to be threaded onto the box toward the center thereof to clamp therebetween the butted ends of spokes formed at their butted ends to conform to the concave opposed inner surfaces of the hub sections.

A final object of this invention is the provision, in a manner as hereinafter set forth, of a wheel hub of attractive appearance, light in weight, strong, durable, easily assembled and disassembled, and inexpensive to manufacture.

The invention will be best understood from a consideration of the following detailed description taken in connection with the accompanying drawings forming part of this specification, with the understanding that the invention is not confined to any strict conformity with the showing of the drawings, but may be changed and modified so long as such changes and modifications mark no material departure from the salient features of the invention as expressed in the appended claims.

In the drawings:—

Figure 1:
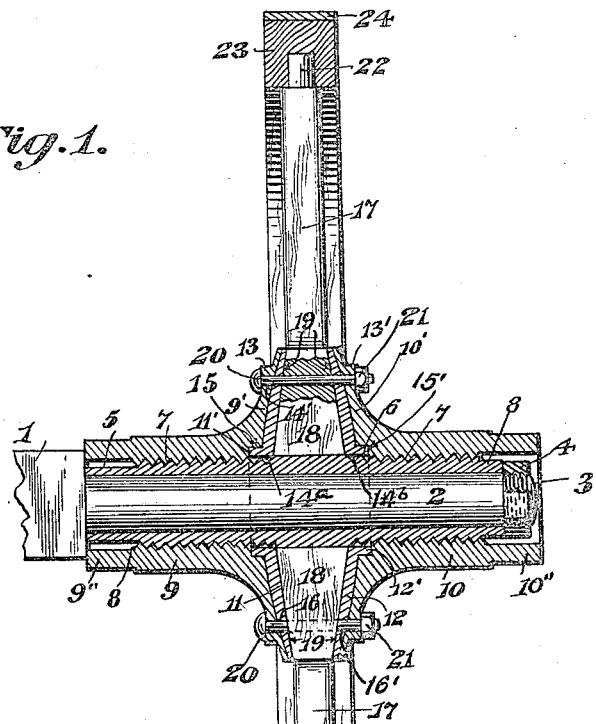
Figure 1 is a vertical transverse section of a wheel and hub constructed in accordance with this invention.
Figure 2:
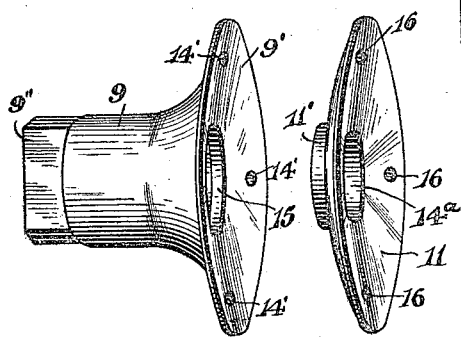
Figure 2 is a detail view of one half of the hub structure.

Referring now to the drawings in detail wherein like numerals of reference indicate corresponding parts throughout the several views of the drawings, an axle 1 is shown having the usual spindle 2 terminating in a screw threaded end 3 adapted to receive a nut 4.

Figure 3:
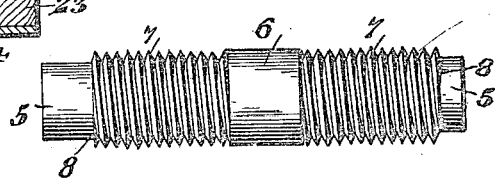
Figure 3 is a detail view of the box structure of the wheel.

The hub structure embodying this invention comprises, an axle box 5 having a portion intermediate its ends of greater diameter than the end of the box as indicated at 6, in Figure 3. Extending from either side of this portion 6 toward each end, are screw threads 7 which terminate inwardly of the ends of the axle box as at 8, thus forming the ends of the box of less diameter than the central and threaded portions. This structure revolves against the bearing surface 2 of the spindle.

The hub is composed of four concentric portions namely, inner and outer sleeves 9 and 10, respectively, and inner and outer abutting plates 11 and 12, respectively. Each of the sleeves 9 and 10, has a portion of its interior surface screw threaded to correspond with the threads 7 upon the axle box on which the sleeves are carried. Each sleeve terminates at its inner end in a flared circular portion of concavo-convex contour as at 9' and 10', and the outer surface of each of these flared portions has formed thereon abutments 13 and 13' respectively, and through each of these abutments and the plates are formed passages 14 and 14'. The other or outer ends of each sleeve are formed of square or hexagonal contour 9" and 10", respectively, to provide a surface which may be engaged by a wrench.

The abutment plates 11 and 12 are also of concavo-convex form, and have a central bore 14$^a$ and 14$^b$ therethrough of a diameter equal to the circumference of the portion 6 of the axle box and each of these plates is formed to provide an outstanding flange 11' and 12', respectively, which flanges have an internal diameter equal to the internal diameter of the adjacent bore 14ª or 14ᵇ and are substantially of the same thickness as the body of the plates, and further when the plates are each in position fits into a recess 15 or 15' respectively in the body of the sleeve against which it abuts. The arc described by the exterior surface of each plate is the same as the arc described by the inner surface of the flared end of the sleeve, and when the wheel is assembled, these surfaces are together as is clearly shown in Figure 1 of the drawings. Apertures 16 and 16' are provided in each of the plates which correspond to the apertures 14 and 14' through the flared ends of the sleeve.

The spokes 17 used in this wheel are churn butted, but instead of having their outer sides substantially parallel throughout, these spokes have their butt ends flared as at 18, and the ends of the flared ends of these spokes rest against the portion 6 of the axle box, and the diverging sides 19 abut the inner surfaces of the plates 11 and 12, when the wheel is assembled as shown in Figure 1.

Bolts 20 are passed through the alined apertures 14, 14', 16 and 16' of the four members of the hub body, and nuts 21 are drawn tight against the raised surfaces 13' to draw the parts together to securely clamp them against the flared portions 18 of the spokes.

The outer ends of the spokes 17 are of reduced diameter as shown at 22, and these reduced ends are mortised into the felly 23 which is surrounded by the usual rim member 24.

In assembling this wheel, the abutment plates 11 and 12 are first placed upon the axle box 5 and moved toward the center thereof. It will be noted that these abutment plates do not thread onto the axle box, but have a central bore of sufficient diameter to allow them to be slipped over the threaded portion. The inner sleeve 9 may be then threaded onto one end of the box 5 until the outer end of the sleeve is in the same plane with the end of the axle box. The spokes 17 are then placed in position, with the inner end of the portion 18 resting against the intermediate portion 6 of the axle box. When all of the spokes are in position, the plate 12 may then be forced inwardly to engage the flared side 19 of the spokes thus forcing them over against the other plate 11. The outer sleeve 10 is then threaded onto the axle box until its flared portion 10' is tightly pressed against the plate 12, and when the openings 14 and 14' are in alinement with the openings 16 and 16' of the plates, the bolts 20 are passed therethrough and through the base of certain of the spokes which are provided with passages for alinement with these apertures, whereupon the nuts 21 may be applied to the bolts and the parts tightly secured. The wheel is now ready for application to the spindle of the axle, and after having been slipped thereon, the nut 4 is applied to the axle in the usual manner, to prevent the accidental removal of the axle box.

Having thus described my invention, what I claim as new is:—

1. In a wheel of the character described, an axle box, spokes having their inner ends abutting said axle box and further being flared laterally at these ends, substantially concavo-convex plate members having a central aperture therethrough and further having an annular flange concentric with said aperture and upon the convex side of said plate, said apertures being traversed by said box, and the concave sides of said plate engaging the flared sides of said spokes, sleeve hub members threaded upon said box one on the outside of and engaging each plate, and means for securing the parts together.

2. In a wheel of the character described, an axle box, spokes having their inner ends abutting said axle box and further being flared laterally at these ends, substantially concavo-convex plate members having a central aperture therethrough and further having an annular flange concentric with said aperture and upon the convex side of said plate, said apertures being traversed by said box, and the concave sides of said plate engaging the flared sides of said spokes, sleeve hub members threaded upon said box one on the outside of and engaging each plate, and means for securing the parts together, each of said sleeve members having its inner end flared and of substantially concavo-convex conformation, the concave side of each sleeve member having an annular recess therein to receive said annular flange and said concave side of each sleeve member further being adapted to snugly engage the convex surface of the plate member adjacent thereto.

In testimony whereof, I affix my signature hereto.

WILLIAM HOVEY.